(12) United States Patent
Gretz

(10) Patent No.: US 6,770,811 B1
(45) Date of Patent: Aug. 3, 2004

(54) PREPACKAGED MOUNTING ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/657,865

(22) Filed: Sep. 9, 2003

Related U.S. Application Data

(63) Continuation-in-part of application No. 10/464,334, filed on Jun. 18, 2003, which is a continuation-in-part of application No. 10/361,292, filed on Feb. 10, 2003, now Pat. No. 6,632,998, which is a continuation-in-part of application No. 10/287,088, filed on Nov. 4, 2002, now Pat. No. 6,646,201, which is a continuation-in-part of application No. 10/012,584, filed on Nov. 7, 2001, now Pat. No. 6,509,524, and a continuation-in-part of application No. 10/017,571, filed on Oct. 22, 2001, now Pat. No. 6,677,523, which is a continuation-in-part of application No. 09/784,981, filed on Feb. 16, 2001, now Pat. No. 6,355,883, which is a continuation-in-part of application No. 09/373,431, filed on Aug. 13, 1999, now Pat. No. 6,191,362.

(51) Int. Cl.[7] .................................................. H02G 3/08
(52) U.S. Cl. ............................ 174/50; 174/58; 174/53; 220/3.2; 220/3.3; 248/906
(58) Field of Search .............................. 174/58, 50, 60, 174/135, 53, 17 R, 48, 61; 220/3.2, 3.7, 3.8, 3.6, 4.02, 3.5, 3.3, 3.9; 52/39; 439/535; 248/906, 343

(56) References Cited

U.S. PATENT DOCUMENTS

| | | | | |
|---|---|---|---|---|
| 4,892,211 A | * | 1/1990 | Jorgensen | 220/3.2 |
| 5,234,119 A | * | 8/1993 | Jorgensen et al. | 220/3.9 |
| 5,522,577 A | * | 6/1996 | Roesch | 52/39 |
| 5,728,973 A | * | 3/1998 | Jorgensen | 174/65 R |
| 5,857,581 A | * | 1/1999 | Jorgensen | 220/3.3 |
| 5,860,548 A | | 1/1999 | Kerr, Jr. | |
| 5,865,443 A | * | 2/1999 | Abe | 174/61 |
| 5,939,671 A | * | 8/1999 | Gretz | 174/50 |
| 6,096,974 A | | 8/2000 | Reiker | |
| 6,107,568 A | * | 8/2000 | Schnell et al. | 174/61 |
| 6,191,362 B1 | * | 2/2001 | Gretz | 174/58 |
| 6,303,862 B1 | * | 10/2001 | Reiker | 220/3.9 |
| 6,355,883 B1 | * | 3/2002 | Gretz | 174/58 |
| 6,509,524 B1 | * | 1/2003 | Gretz | 174/50 |
| 6,545,216 B1 | | 4/2003 | Bell et al. | |
| RE38,120 E | | 5/2003 | Bordwell et al. | |
| 6,632,998 B1 | * | 10/2003 | Gretz | 174/58 |
| 6,646,201 B1 | * | 11/2003 | Gretz | 174/58 |

* cited by examiner

Primary Examiner—Dean A. Reichard
Assistant Examiner—Angel R. Estrada

(57) ABSTRACT

A prepackaged mounting assembly for securing an electrical fixture, such as a ceiling fan, light fixture, or similar device to an overhead support. The prepackaged mounting assembly includes an electrical junction box having a top wall, a downward extending peripheral side wall, and an open bottom. Openings are provided within the electrical junction box for temporary storage of load bearing fasteners. An initial fastener is provided in the top wall for initially securing the assembly to the overhead support thus freeing the installer's hands for subsequent installation steps. The load bearing fasteners are then removed from their temporary storage locations and the connection member of an electrical fixture is aligned below the electrical junction box. The fixture may then be secured to the overhead support by threading the load bearing fasteners through the top of the electrical fixture and into the overhead support. The design of the prepackaged mounting assembly insures that no part of the load bearing fasteners contact the electrical junction box, and therefore the entire load of the suspended fixture is supported entirely by the load bearing fasteners and the overhead support and not the electrical junction box. The junction box is constructed of metal to allow establishment of electrical continuity between the box and any electrical raceways or conduit that it is connected to.

12 Claims, 5 Drawing Sheets

PREPACKAGED MOUNTING ASSEMBLY

This application which is a Continuation-In-Part of U.S. patent application Ser. No. 10/464,334 entitled "Prepackaged Mounting Assembly and Bracket Combination", filed Jun. 18, 2003 still pending, which is a Continuation-In-Part of U.S. patent application Ser. No. 10/361,292 entitled "Prepackaged Mounting Assembly with Holstered Screws", filed Feb. 10, 2003, now U.S. Pat. No. 6,632,998, which is a Continuation-In-Part of U.S. patent application Ser. No. 10/287,088 entitled "Prepackaged Mounting Assembly", filed Nov. 4, 2002, now U.S. Pat. No. 6,646.201, which is a Continuation-In-Part of U.S. patent application Ser. No. 10/012,584 entitled "Prepackaged Mounting Assembly", filed Nov. 7, 2001, now U.S. Pat. No. 6,509,524, and a Continuation-In-Part of U.S. patent application Ser. No. 10/017,571 entitled "Electrical Fixture Mounting Box and Mounting Assembly", filed Oct. 22, 2001, now U.S. Pat. No. 6,677,523, which is a Continuation-In-Part of U.S. patent application Ser. No. 09/784,981 entitled "Electrical Fixture Mounting Box and Mounting Assembly", filed Feb. 16, 2001, now U.S. Pat. No. 6,355,883, which is a Continuation-In-Part of U.S. patent application Ser. No. 09/373,431 entitled "Electrical Fixture Mounting Box", filed Aug. 13,1999, now U.S. Pat. No. 6,191,362.

FIELD OF THE INVENTION

The present invention relates to devices and methods for mounting ceiling fans and other large and heavy electrical fixtures to ceilings. More particularly, the present invention describes a prepackaged mounting assembly for providing easy attachment of an electrical fixture to a rafter or similar building structure. The prepackaged mounting assembly comprises a metal electrical junction box and fasteners in temporary storage locations in the junction box. The junction box is secured to a suitable structural surface. The fasteners are removed from the temporary storage locations and moved to their permanent locations to secure an electrical fixture to the bracket. The junction box includes an integral electrical junction box for storage of wiring connections.

BACKGROUND OF THE INVENTION

When installing electrical devices and fixtures, it is desirable to include fasteners with each separate electrical device that is sold. Including fasteners with the electrical device relieves the installer from the time consuming task of separately locating and purchasing appropriate fasteners for the intended use. Electrical mounting devices such as outlet boxes for example, are supplied by the manufacturer with fasteners attached to each separate device. This allows a hardware store to display and market a total package to the consumer and absolves the consumer of the task of locating and purchasing the required fasteners. It also eliminates the time and effort required for the consumer to locate the correct bin and obtain the correct fastener. By supplying the correct fasteners with each device, both the homeowner and professional installers are freed of the task of locating fasteners at the time of installation. Prepackaged fasteners therefore are very convenient and desirable in modern construction or remodeling projects.

One application that would benefit from prepackaged fasteners is the mounting device for supporting ceiling-mounted electrical fixtures such as ceiling fans. It is common to hang electrical fixtures such as lights and fans from ceilings. Although many mounting devices have been proposed for this task, they typically do not include prepackaged fasteners as part of the mounting device. This forces the installer to obtain the fasteners separately and have them ready at the job site at the time of installation. In addition, if the fasteners are not conveniently located with the mounting device, it becomes quite tedious for an installer to hold the mounting device overhead while inserting a fastener, thread the fastener into a support structure, and tighten the fastener therein enough to secure the device to the structure.

Several manufacturers have sought to include fasteners with the mounting device by packaging the device in a container, such as a box, and including the fasteners in a separate container within the box, such as a plastic bag. This solves the problem of obtaining the fasteners separately, but is undesirable as the packaging adds to the cost of the device and the fasteners are not held in a location convenient to the job. The installer must typically remember to remove the bag of fasteners and carry it with the device to the installation site. Furthermore, if the fasteners are lost, there is a risk that the installer will use the wrong fasteners, thereby creating an unsafe and dangerous installation.

U.S. Pat. Nos. 6,191,362 (hereinafter the '362 patent) and U.S. Pat. No. 6,355,883 (hereinafter the '883 patent) to Gretz, both incorporated herein by reference in their entirety, therefore proposed a mounting assembly that included extended recesses and apertures the purpose and utility of which was to provide a location for the placement of mounting bolts or screws during shipment and prior to installation. As stated in this disclosure, the inclusion of mounting bolts or screws, frictionally engaged in apertures assures the immediate availability of such fasteners at the appropriate time to the installation process. The mounting assemblies included a channel with teeth for engaging a rafter for attaching an electrical fixture thereto.

U.S. patent application Ser. No. 10/017,571, filed Oct. 22, 2001 and incorporated herein by reference in its entirety, proposed a mounting assembly with a channel for attachment to an overhead rafter. The mounting assembly included a junction box and at least one holster included with the box. The holster comprised an integral tubular projection from the box with the tubular projection open to and communicating with the interior volume at a first end joining the box and either open or closed at a second end away from the box. This disclosure therefore proposed an electrical device to mounting assembly that provided prepackaged fasteners. The prepackaged fasteners are provided in temporary storage receptacles during storage and shipment of the box. At the assembly site, the fasteners are typically moved to the appropriate location for anchoring the box.

U.S. Pat. No. 6,509,524 filed Nov. 7, 2001, and U.S. Pat. No. 6,646,201, filed Nov. 4, 2002, both incorporated herein by reference in their entirety, provided an L-shaped mounting assembly for flush mounting on a horizontal rafter. The mounting assemblies included integral holsters as temporary storage locations for fasteners during storage and shipment. The holsters provide a temporary storage location for the fasteners, protect their ends while storing them therein, and hold the fasteners securely until they are purposely removed by the user.

U.S. Pat. No. 6,632,998, filed Feb. 10, 2003 and incorporated herein by reference in its entirety, provided a mounting assembly for securing an electrical fixture to a sloped ceiling. The mounting assembly included two embodiments, one for use with a cathedral ceiling and one for use with a vaulted ceiling. The mounting assembly included an electrical enclosure and a seat for flush fitting against an appropriate brace. An initial fastening screw was included partially secured in a boss below the seat. The box was secured to a brace using the initial fastening screw, the brace secured to an overhead rafter on a sloped ceiling, and an electrical fixture installed to the mounting assembly by removing the threaded fasteners from their respective holsters and securing them through the bracket of the electrical fixture and into the brace.

Although the above referenced inventions and disclosures provide various useful mounting assemblies, they are not suitable for mounting fans or electrical devices in all jurisdictions. In some jurisdictions, the electrical code does not permit plastic electrical boxes. In these situations, it is imperative that a metal electrical box be provided to meet local electrical codes. Accordingly, it is desirable at times to have a prepackaged mounting assembly including an electrical box constructed of metal for mounting electrical fixtures to a ceiling or other overhead structure.

The mounting assembly of the present invention will therefore provide a mounting assembly having all the required hardware for securing an electrical fixture to the side of an overhead rafter.

An advantage of the present invention is that the mounting assembly is constructed of metal, which allows the mounting assembly to meet the electrical code in some jurisdictions where plastic boxes are not permitted.

The mounting assembly, being constructed of metal, therefore provides the advantage of establishing electrical continuity with any metal raceways or wiring conduits when connected thereto.

A further advantage is that the mounting assembly provides a means of holding the fasteners securely until needed at the job site, so that there will be no loss or displacement of fasteners during storage or shipment.

By providing the load support screws with the mounting assembly, the present invention insures that there would be no mix-up or mistake by an installer in supporting a heavy ceiling fan or other device by using a fastener that is not appropriate for the intended load.

An additional advantage provided by the mounting assembly is that the load support screws go directly into the ceiling rafter, so that no portion of the load is supported by the electrical box itself but rather is supported entirely by the ceiling structure.

The present invention therefore provides a mounting assembly that does not require separate packaging enclosing it or enclosing fasteners provided separately with the assembly.

The present invention will furthermore provide a mounting assembly including an integral junction box for wiring connections.

These, and other advantages will be apparent to a person skilled in the art by reading the attached description along with reference to the attached drawings.

SUMMARY OF THE INVENTION

According to the present invention, there is provided a prepackaged mounting assembly for securing an electrical fixture, such as a ceiling fan, light fixture, or similar device to an overhead support. The prepackaged mounting assembly includes an electrical junction box having a top wall, a downward extending peripheral side wall, and an open bottom. Openings are provided within the electrical junction box for temporary storage of load bearing fasteners. An initial fastener is provided in the top wall for initially securing the assembly to the overhead support and thus freeing the installer's hands for subsequent installation steps. The load bearing fasteners are then removed from their temporary storage locations and the connection member of an electrical fixture is aligned below the electrical junction box. The fixture is then secured to the overhead support by threading the load bearing fasteners through the top of the electrical fixture and into the overhead support The design of the prepackaged mounting assembly insures that no part of the load bearing fasteners contact the electrical junction box, and therefore the entire load of the suspended fixture is supported entirely by the load bearing fasteners and the overhead support and not the electrical junction box. The junction box is constructed of metal to allow establishment of electrical continuity between the box and any electrical raceways or conduit that it is connected to.

Figure 1:
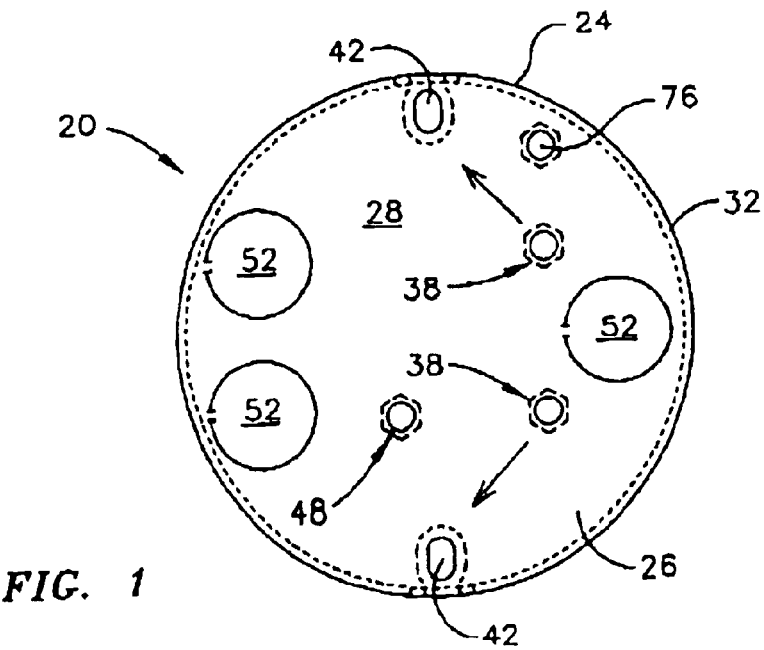
FIG. 1 is a top view of a preferred embodiment of a prepackaged mounting assembly according to the present invention.

Table of Nomenclature
The following is a listing of part numbers used
in the drawings along with a brief description:

| Part Number | Description |
|---|---|
| 20 | prepackaged mounting assembly |
| 22 | overhead support |
| 24 | electrical junction box |
| 26 | top wall |
| 28 | top surface of top wall |
| 30 | bottom surface of top wall |
| 32 | peripheral side wall |
| 34 | bottom edge of side wall |
| 36 | interior volume |
| 38 | first opening |
| 40 | first or load bearing fastener |

-continued

Table of Nomenclature
The following is a listing of part numbers used
in the drawings along with a brief description:

| Part Number | Description |
| --- | --- |
| 42 | aperture in top wall |
| 44 | integral extension from side wall |
| 46 | aperture in integral extension |
| 48 | second opening |
| 50 | initial fastener |
| 52 | offset areas |
| 54 | knockout openings |
| 56 | peripheral wall of first opening |
| 58 | smooth inner surface |
| 60 | point end of first fastener |
| 62 | head end of first fastener |
| 64 | alternative embodiment of prepackaged mounting assembly |
| 66 | protective caps |
| 68 | electrical cable |
| 70 | wiring leads |
| 72 | connection member of a ceiling fixture |
| 74 | ceiling fixture |
| 76 | ground screw |
| 78 | apertures in connection member |
| 80 | snap-in cable holder |
| W1 | width of first fastener |
| W2 | width of aperture in integral extension |
| W3 | width of aperture in top wall |
| L1 | inner length of peripheral side wall |
| A | direction of removal of first fastener from first opening |
| B | direction of lateral movement of first fastener for alignment |
| C | direction of movement of first fastener to secure to support |

DETAILED DESCRIPTION

Referring to FIGS. 1–4, the preferred embodiment of a prepackaged mounting assembly 20 is used to secure an electrical fixture (not shown) to a rafter, ceiling, or other overhead support 22. The prepackaged mounting assembly 20 includes an electrical junction box 24 with a top wall 26 having a top surface 28, and a bottom surface 30. The top wall 26 includes a downward extending peripheral side wall 32 having a bottom edge 34 and defining an interior volume 36. The top wall 26 includes at least one first opening 38 extending from the bottom surface 30 of the electrical junction box 24. The prepackaged mounting assembly 20 includes a first or load bearing fastener 40 frictionally engaged in each of the first openings 38 for temporary storage of the first fastener with the prepackaged mounting assembly 20 prior to installation. Apertures 42 are provided in the top wall 26 and integral extensions 44 on the side wall extend into the interior volume 36. Apertures 46 within the integral extensions 44 are in vertical alignment with the apertures 42 in the top wall 26.

A second opening 48 in the electrical junction box 24 extends from the bottom surface 30. An initial fastener 50 is frictionally engaged in the second opening 48, with the initial fastener 50 extending no further than the top surface 28 of the electrical junction box 24.

Figure 3:
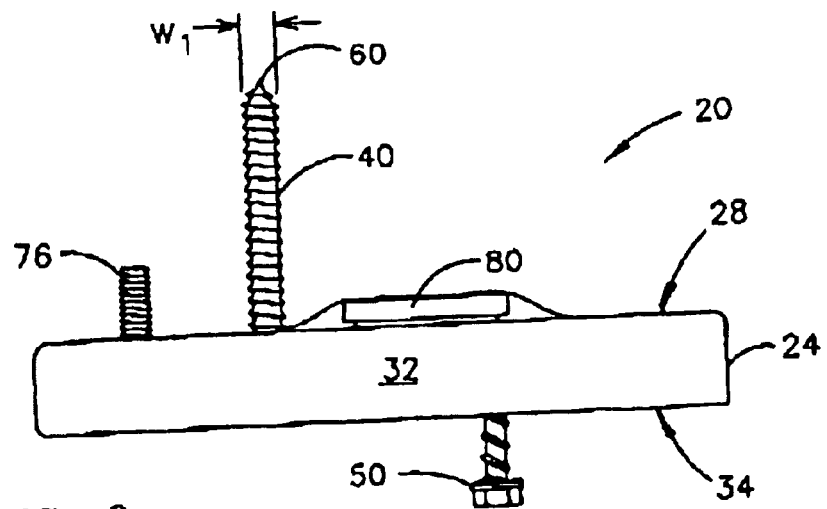
FIG. 3 is a side view of the prepackaged mounting assembly of FIG. 1.
Figure 4:
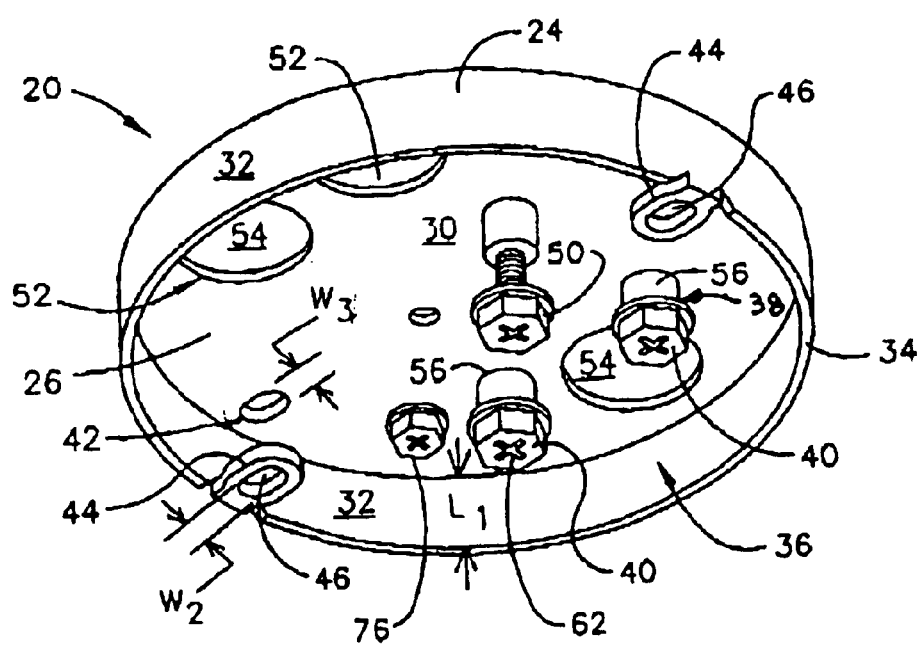
FIG. 4 is a perspective view of the prepackaged mounting assembly of FIG. 1.
Figure 8:
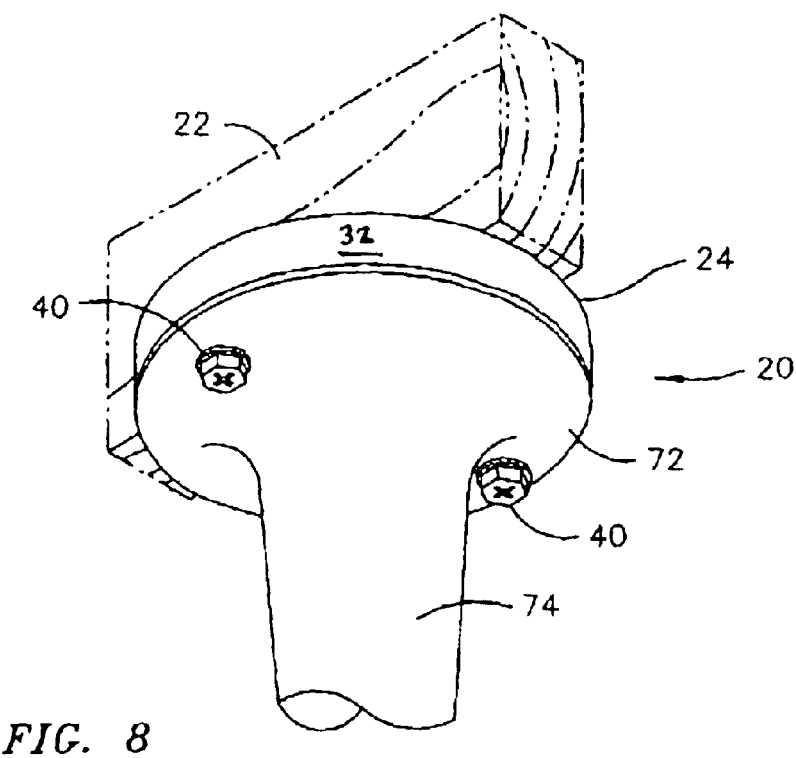
FIG. 8 is a perspective view showing the completed installation of a ceiling fixture to a rafter using the prepackaged mounting assembly of the present invention.

Referring to FIGS. 3 and 4, the apertures 42 in the top wall 26 and the apertures 46 in the integral extensions 44 are located adjacent the peripheral side wall 32. The first fastener 40 is of a first width W1, the aperture 46 in the integral extension 44 is of a second width W2, and the aperture 42 in the top wall 26 is of a third width W3. The width (W1) of the first fastener 40 is less than or equal to the width (W2) of the aperture 46 in the integral extension 44 and is also less than or equal to the width (W3) of the aperture 42 in the top wall 26 to insure that when the first fastener 40 is used to secure a fixture from an overhead support 22, such as shown in FIG. 8, the full weight of the suspended load will be supported by the overhead support, and not by any part of the electrical junction box 24.

The electrical junction box 24 of the prepackaged mounting assembly 20 is preferably constructed of metal. Suitable metals for construction of the electrical junction box 24 include galvanized steel and zinc-plated steel. The thickness of the metal used to construct the electrical junction box 24 is typically between 0.50 and 0.090 inch.

As shown in FIGS. 3, 4, 6, and 7, the prepackaged mounting assembly 20 includes offset areas 52 that are capable of being knocked out to form knockout openings 54 in the top wall 26 for entry of electrical cable 68 into the interior volume 36 of the electrical junction box 24.

Figure 6:
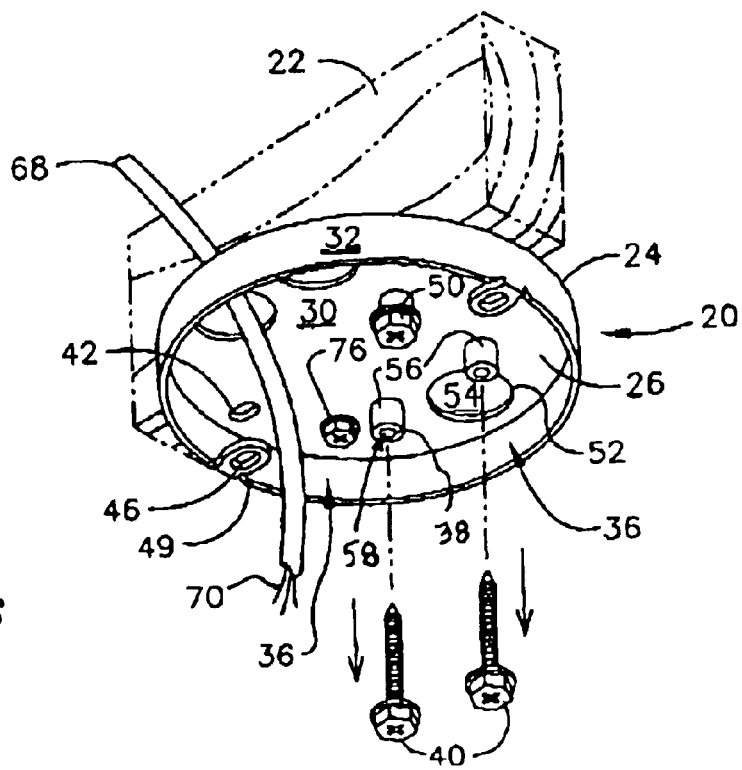
FIG. 6 is a perspective view showing the electrical box secured to the rafter by an initial mounting fastener and with the fan supporting screws removed from their temporary storage positions.

Referring to FIGS. 4 and 6, the first opening 38 of the prepackaged mounting assembly 20 typically includes a peripheral wall 56 extending downward from the bottom surface 30 of the top wall 26. The peripheral wall 56 of the first opening 38 typically includes inner surface 58. Alternatively, the peripheral wall 56 could include female threads to receive the male threads on a suitable fastener. The first fastener 40 is typically a self-threading screw that can be rotated and tightened into the peripheral wall 56 to threads upon the smooth inner surface 58.

With reference to FIGS. 3 and 4, the bottom edge 34 of the peripheral side wall is circular and has an outer diameter preferably between 3.25 and 5.25 inches. The inner length L1 of the peripheral side wall 32 of the electrical junction box 24, or the length of the side wall 32 as measured from the bottom surface 30 of the top wall 26 to the bottom edge 34 of the side wall 32, is typically between 0.35 and 1.80 inches. The interior volume 36 therefore varies between 5.0 cubic inches with a 0.35 inch side wall and 20.0 cubic inches with a 1.80 inch side wall 32. The bottom edge 34 of the downward extending peripheral wall 32 is planar. The first fasteners 40 include a point end 60 and a head end 62 with the point ends 60 extending upward from the top surface 28 of the top wall 26 and the head ends 62 extending downward from the bottom surface 30 of the top wall 26. The first fasteners 40 are typically positioned such that the head ends 62 are within the interior volume 36 of the electrical junction box 24 and extend no further downwards than the plane defined by the bottom edge 34 of the peripheral side wall 32.

Figure 9:
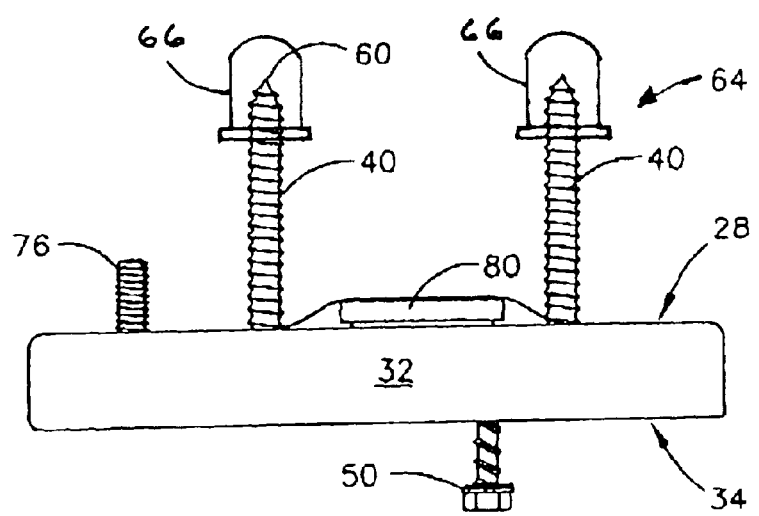
FIG. 9 is a side view an alternative embodiment of the prepackaged mounting assembly, which provides protection for the ends of the load support fasteners.

An alternative embodiment of the prepackaged mounting assembly 64 is depicted in FIG. 9. This embodiment of the prepackaged mounting assembly 64 includes protective caps 66 that snap onto the point ends 60 of the first fasteners 40 to protect the points during storage and shipment and to provide a safety factor for installers handling the assembly. The protective caps are typically constructed of plastic.

Operation of the prepackaged mounting assembly of the present invention may be best understood with reference to FIGS. 5 through 8, which pictorially depict the present invention in the sequence of being installed on an overhead structure.

Figure 5:
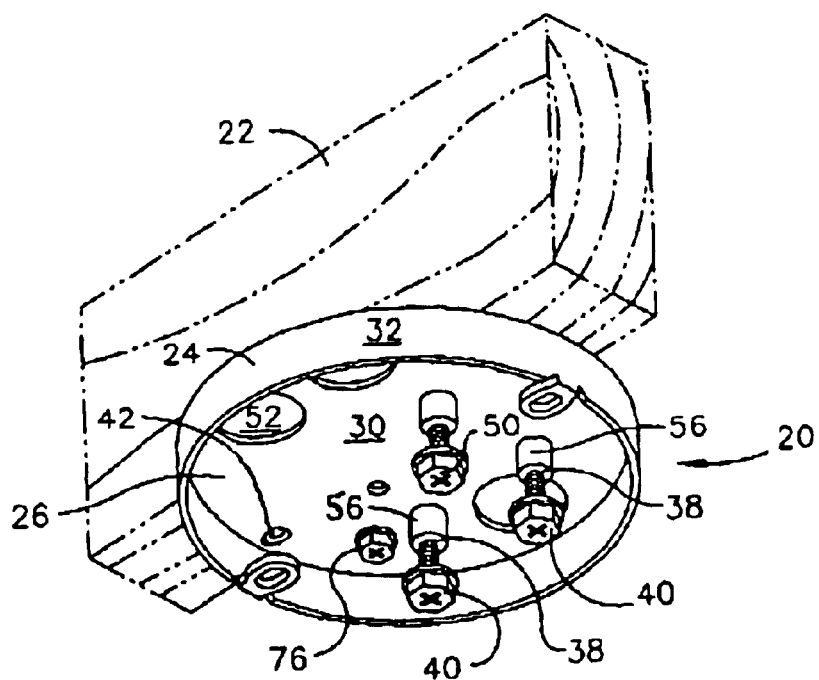
FIG. 5 is a perspective view of the prepackaged mounting assembly of FIG. 1 positioned below a rafter and ready to be lifted and mounted thereto.

As shown in FIG. 5, a suitable overhead support 22 is first located. The prepackaged mounting assembly 20 is placed against the overhead support 22 such that the apertures 42 in the top wall 26 of the electrical junction box 24 are aligned underneath the overhead support 22.

Referring to FIG. 6, the electrical junction box 24 is secured to the overhead support 22 by rotating the initial fastener 50 into the overhead support. As shown in the bottom view of the prepackaged mounting assembly in FIG.

2, a typical overhead support 22 is a 2"×4" stud, and the electrical junction box 24 would typically be centered under the support 22. Centering the junction box 24 on the support 22 insures that the initial fastener 50 and the apertures 42 for receipt of first or load bearing fasteners 40 are positioned under the support 22. At this point, as shown in FIG. 6, the electrical junction box 24 is secured to the overhead support 22 with the initial fastener 50, which is not a load bearing fastener capable of supporting a load beneath the box 24, but is rather a means for securing the electrical box 24 to the support to free the installer's hands for the remaining installation steps.

With the electrical junction box 24 secured firmly to the overhead support 22 as shown in FIG. 6, the installer is free to remove one or more offset areas 52 from the top wall 26 to form a knockout cable opening 54 therein. Electrical cable 68 including wiring leads 70 can then be fed into the interior volume 36 of the electrical junction box 24. The installer would then remove the first fasteners 40 from the first openings 38 as shown.

Figure 7:
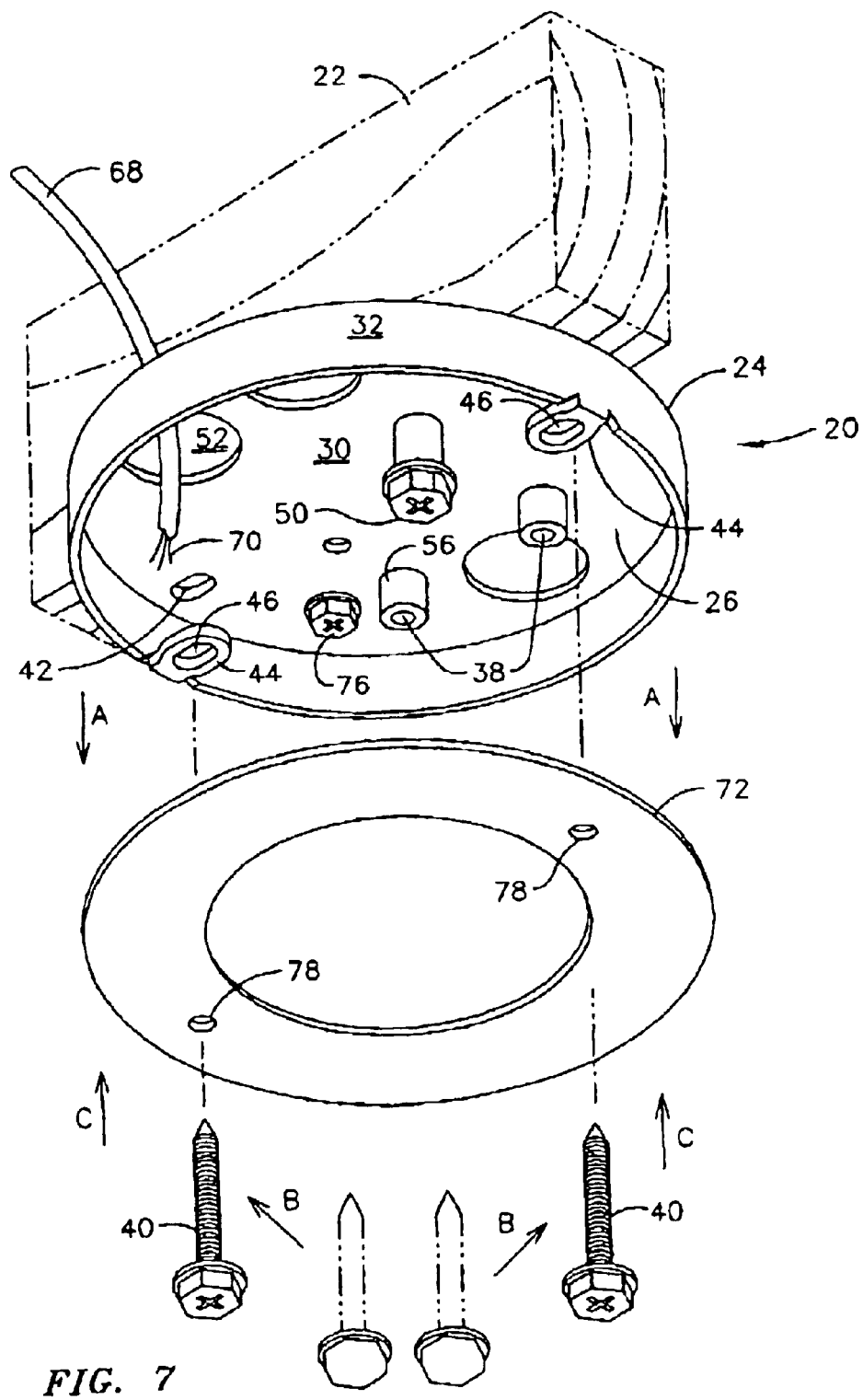
FIG. 7 is a perspective view showing the electrical box secured to a rafter by an initial mounting fastener, the support ring of an electrical device positioned in alignment with the box, and the movement and alignment of the fixture support fasteners from their temporary storage positions to their permanent load support positions.

Referring to FIG. 7, the connection member 72 of a typical ceiling fixture 74 is raised into close proximity to the electrical junction box 24 and the wiring leads 70 are connected to the wiring of the fixture 74. A ground screw 76 is provided with the junction box 24 for securing the ground wire thereto. The apertures 78 in the connection member 72 are then aligned with the apertures 46 in the integral extensions 44 from the peripheral wall 32 of the electrical junction box 24. The ceiling fixture 74 is then secured to the overhead support 22 by installing the first fasteners 40 through the apertures 46 in the integral extensions 44, through the apertures 42 in the top wall 26, and into the overhead support 22. The directional arrows shown in phantom lines in FIG. 7 trace the direction taken by the first or load bearing fasteners 40 as they are 1) removed (arrow A) from the first openings 38 or temporary storage positions, 2) moved laterally (arrow B) to place them in alignment with the apertures 78 in the connection member 72, apertures 46 in the integral extensions 44, and apertures 42 in the top wall 26, and 3) threaded upwards (arrow C) into the overhead support 22.

After the first 40 or load bearing fasteners are tightened into the overhead support 22, as shown in FIG. 8, the ceiling fixture 74 is secured to the overhead support 22. Referring to FIG. 7, the apertures 46 in the integral extensions 44 and the apertures 42 in the top wall 26 are of a larger width than the major thread diameter of the load bearing or first fasteners 40, therefore the entire load is held by the load bearing fasteners 40 and not by any portion of the electrical junction box 24.

Figure 2:
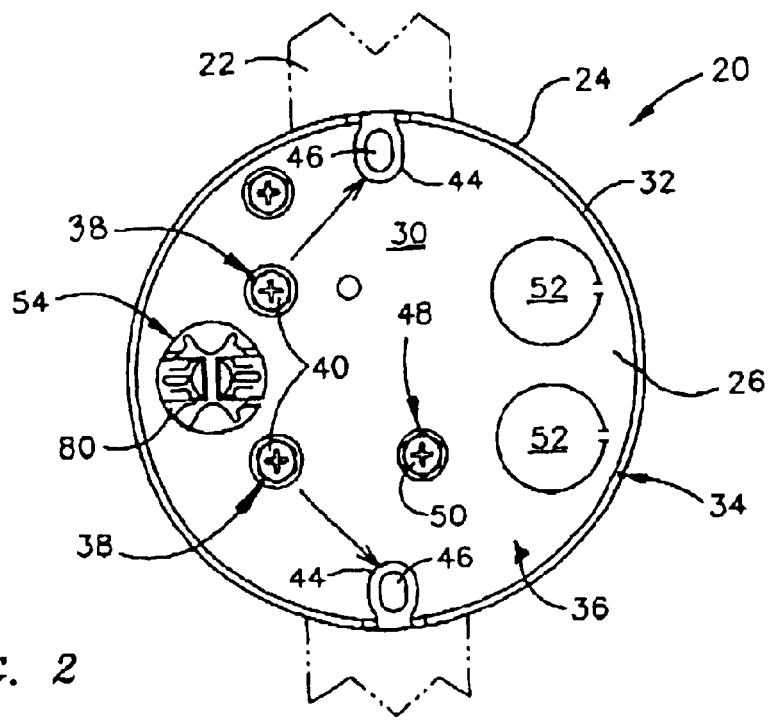
FIG. 2 is a bottom view of the prepackaged mounting assembly of FIG. 1.

With reference to FIG. 2, one or more of the offset areas 52 in the top wall 26 may be removed and a snap-in cable holder 80 inserted therein for gripping any cables later inserted therein and thus providing strain relief to the inserted cable and providing closure of the open area between the electrical cable and the electrical junction box 24.

As the invention has been described, it will be apparent to those skilled in the art that the same may be varied in many ways without departing from the spirit and scope of the invention. Any and all such modifications are intended to be included within the scope of the appended claims.

What is claimed is:

1. A prepackaged mounting assembly for securing a fixture of the type having a connection member and apertures therein to an overhead support comprising:

an electrical junction box including a top wall having a top surface and a bottom surface;

said top wall including a downward extending peripheral side wall having a bottom edge and defining an interior volume;

a first opening in said electrical junction box extending from said bottom surface;

a first fastener having a major thread diameter, said first fastener frictionally engaged in said first opening for temporary storage of said first fastener with said electrical junction box prior to installation;

apertures in said top wall;

integral extensions on said side wall extending into said interior volume, said integral extensions including apertures in vertical alignment with said apertures in said top wall;

said apertures in said integral extensions and said apertures in said top wall having a larger width than said major thread diameter of said first fastener;

a second opening in said electrical junction box extending from said bottom surface; and an initial fastener fictionally engaged in said second opening, said initial fastener extending no further than said top surface of said electrical junction box whereby said larger width of said apertures in said integral extensions and said apertures in said top wall enable said fixture to be supported entirely by said first fasteners and said overhead support.

2. The prepackaged mounting assembly of claim 1 wherein said apertures in said top wall and said apertures in said integral extensions are adjacent said peripheral side wall.

3. The prepackaged mounting assembly of claim 1 wherein said top wall includes offset areas that are capable of being knocked out to form openings in said top wall for entry of electrical cable.

4. The prepackaged mounting assembly of claim 1 wherein said bottom edge of said downward extending peripheral side wall resides in a plane;

said first fasteners include a point end and a head end;

said point ends extend upward from said top surface of said top wall; and said head ends extend downward from said bottom surface of said top wall no further than said plane.

5. The prepackaged mounting assembly of claim 1 wherein said electrical junction box is constructed of metal.

6. The prepackaged mounting assembly of claim 5 wherein said electrical junction box is constructed of galvanized steel.

7. The prepackaged mounting assembly of claim 5 wherein said electrical junction box is constructed of zinc plated 1010 steel.

8. The prepackaged mounting assembly of claim 5 wherein said metal is between 0.50 and 0.090 inch in thickness.

9. The prepackaged mounting assembly of claim 1 wherein said bottom edge of said peripheral side wall is circular.

10. The prepackaged mounting assembly of claim 9 wherein said circular peripheral side wall includes an outer diameter between 3.25 and 5.25 inches.

11. The prepackaged mounting assembly of claim 10 wherein said interior volume is between 5.0 and 20.0 cubic inches.

12. A method of attaching a fixture of the type having a connection
- providing a metallic electrical junction box including a top wall having a top surface and a bottom surface;
- providing a peripheral side wall extending downward from said top wall and having a planar bottom edge and defining an interior volume;
- providing a first opening in said electrical junction box extending from said bottom surface;
- providing a first fastener having a major thread diameter, said first fastener frictionally engaged in said first opening for temporary storage of said first fastener with said electrical junction box prior to installation;
- providing apertures in said top wall;
- providing integral extensions on said side wall extending into said interior volume, said integral extensions including apertures in vertical alignment with said apertures in said top wall;
- providing said apertures in said integral extensions and said apertures in top wall with a larger width than said major thread diameter of said first fastener;
- providing a second opening in said electrical junction box extending from said bottom surface;
- providing an initial fastener frictionally engaged in said second opening, said initial fastener extending no further than said top surface of said electrical junction box
- providing a knockout area in said top wall;
- placing said top surface of said metallic electrical junction box against said overhead support such that said apertures in said top wall are against said overhead support;
- securing said electrical box to said overhead support by rotating said initial fastener into said overhead support;
- removing said knockout area from said top wall to form a cable opening;
- removing said first fastener from said first opening;
- installing electrical cable including wiring leads through said cable opening into said interior volume;
- connecting said wiring leads to said fixture;
- aligning said apertures of said connection member of said fixture with said apertures in said integral extensions; and
- securing said fixture to said overhead support by installing said first fasteners through said apertures in said integral extensions, through said apertures in said top wall, and into said overhead support.

* * * * *